(12) United States Patent
Katagiri et al.

(10) Patent No.: US 8,588,256 B2
(45) Date of Patent: Nov. 19, 2013

(54) TRANSMISSION APPARATUS AND SIGNAL MAPPING METHOD

(75) Inventors: Toru Katagiri, Kawasaki (JP); Hiroyuki Kitajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 60 days.

(21) Appl. No.: 12/961,463

(22) Filed: Dec. 6, 2010

(65) Prior Publication Data

US 2011/0135304 A1 Jun. 9, 2011

(30) Foreign Application Priority Data

Dec. 7, 2009 (JP) ................................. 2009-277482

(51) Int. Cl.
*G01R 31/08* (2006.01)
*G06F 11/00* (2006.01)
*H04J 3/07* (2006.01)

(52) U.S. Cl.
USPC ........... 370/505; 370/229; 370/230; 370/231; 370/351; 370/463; 370/506; 700/10; 700/11; 710/20; 710/21

(58) Field of Classification Search
None
See application file for complete search history.

(56) References Cited

U.S. PATENT DOCUMENTS

| | | | |
|---|---|---|---|
| 6,912,201 B1 * | 6/2005 | Yoshida et al. | ............... 370/248 |
| 6,965,619 B2 | 11/2005 | Bisson et al. | |
| 7,020,094 B2 | 3/2006 | Heiles | |
| 7,394,589 B2 | 7/2008 | Onaka et al. | |
| 2003/0026298 A1 * | 2/2003 | Bisson et al. | ................. 370/537 |
| 2005/0286521 A1 * | 12/2005 | Chiang et al. | ................. 370/389 |
| 2008/0158657 A1 | 7/2008 | Muro et al. | |
| 2010/0067905 A1 * | 3/2010 | Dong et al. | ..................... 398/45 |
| 2011/0004700 A1 * | 1/2011 | Sprague et al. | ............... 709/236 |
| 2012/0039609 A1 | 2/2012 | Dong et al. | |

FOREIGN PATENT DOCUMENTS

| | | |
|---|---|---|
| CN | 101291179 A | 10/2008 |
| JP | 05-292055 | 11/1993 |
| JP | 2001-094523 | 4/2001 |
| JP | 2002-076482 A | 3/2002 |
| JP | 2007-096822 A | 4/2007 |
| JP | 2008-113394 A | 5/2008 |
| JP | 2008-164836 A | 7/2008 |
| JP | 2008-177773 | 7/2008 |
| WO | WO-2009-073198 A1 | 6/2009 |

OTHER PUBLICATIONS

Chinese Office Action dated Mar. 5, 2013 for corresponding Chinese Application No. 201010571062.X, with English-language Translation.
Japanese Office Action mailed Sep. 3, 2013 for corresponding Japanese Application No. 2009-277482, with partial English-language translation.
Partial English-language translation [paragraphs [0005]-[0007], [0029]; Fig. 1] of JP-2008-113394.

\* cited by examiner

*Primary Examiner* — Marcus R Smith
*Assistant Examiner* — Lonnie Sweet
(74) *Attorney, Agent, or Firm* — Fujitsu Patent Center

(57) ABSTRACT

A transmission apparatus exercises insertion control for inserting a client signal and a stuff byte into a payload area in a frame into which the client signal is to be mapped, and sends the frame after the insertion control. In addition, the transmission apparatus inserts the client signal or the stuff byte in columns of the frame into the payload area except a leading column.

10 Claims, 15 Drawing Sheets

| Case | NEGATIVE STUFF BYTE AREA | POSITIVE STUFF BYTE AREA | STATE OF DIFFERENCE IN FREQUENCY |
| --- | --- | --- | --- |
| 1 | STUFF BYTE INSERTED | STUFF BYTE INSERTED | CLIENT SIGNAL FREQUENCY < FRAME FREQUENCY |
| 2 | STUFF BYTE INSERTED | DATA INSERTED | NO DIFFERENCE IN FREQUENCY |
| 3 | DATA INSERTED | DATA INSERTED | CLIENT SIGNAL FREQUENCY > FRAME FREQUENCY |

FIG. 12
Related Art

TRANSMISSION APPARATUS AND SIGNAL MAPPING METHOD

CROSS-REFERENCE TO RELATED APPLICATION

This application is based upon and claims the benefit of priority of the prior Japanese Patent Application No. 2009-277482, filed on Dec. 7, 2009, the entire contents of which are incorporated herein by reference.

FIELD

The embodiment discussed herein is related to a transmission apparatus and a signal mapping method.

BACKGROUND

In optical networks using the WDM (Wavelength Division Multiplexing) technique, mapping of various kinds of signals and transmission of large-capacity signals are required in order to provide various services.

To operate and manage such optical networks, an OTN (Optical Transport Network), for example, is standardized by the ITU-T (International Telecommunication Union Telecommunication Standardization Sector). A frame signal (hereinafter simply referred to as a "frame") for optical transfer is recommended in G. 709 "Interfaces for the Optical Transport Network."

FIG. 7 illustrates the format of an OTN frame. An OTN frame 100 includes an overhead area 101, a payload area 102, and a FEC (Forward Error Correction) area 103.

The overhead area 101 includes a FAS (Frame Alignment Signal) field, an OTU (Optical channel Transport Unit)k OH (Overhead) field, an ODU (Optical channel Data Unit)k OH field, and an OPU (Optical channel Payload Unit)k OH field.

The FAS field is a pattern indicative of the head of the OTN frame. The FAS field and OTUk OH field is an overhead field used for frame synchronization and the management of connection and quality for OTU. The ODUk OH field is an overhead field used for the management of connection and quality for ODU.

A client signal for providing various services is mapped into an OPUk payload area which is the payload area 102. Alternatively, a plurality of ODUjs (j<k) the signal rate of which is lower than that of an OPUk are multiplexed and mapped into the OPUk payload area which is the payload area 102. The FEC area 103 is a field in which redundant data for exercising error control at data transfer time is stored.

"k" of OTUk, ODUk, and OPUk is a symbol indicative of a signal rate type and k=1, 2, 3, and so on are recommended in G. 709. An OTU3, ODU3, and OPU3 frame the OTU bit rate of which is 43.018413559 Gbit/s, an OTU2, ODU2, and OPU2 frame the OTU bit rate of which is 10.709225316 Gbit/s, an OTU1, ODU1, and OPU1 frame the OTU bit rate of which is 2.666057143 Gbit/s, and so on are standardized as OTU, ODU, and OPU frames.

For example, a plurality of SDH (Synchronous Digital Hierarchy) STM (Synchronous Transfer Mode) 16 signals, SDH STM64 signals, SDH STM256 signals, ATM (Asynchronous Transfer Mode) signals, data signals encapsulated by GFP (Generic Framing Procedure specified in the ITU-T recommendation G. 7041) or the like are multiplexed and mapped into these frames and are transferred in optical networks.

In addition, if a client signal is transferred by the use of an OTN frame, it is necessary to map the client signal into the OTN frame while absorbing the difference in signal rate (frequency) between the client signal and the OTN frame.

An asynchronous mapping method is specified in ITU-T G. 709 as a method for absorbing a difference in frequency and is widely used in communication networks.

FIG. 8 illustrates a frame format for describing the asynchronous mapping method. The size of a frame 100a is m rows×n columns. An overhead area 101a stores monitoring and control information and the like and begins from the leading column of the frame 100a. Its size is m rows×r columns. A payload area 102a into which a client signal is mapped follows the overhead area 101a and its size is m rows×(n−r) columns.

With the asynchronous mapping method a positive or negative stuff byte is inserted in bytes according to the difference in signal rate (frequency) between a client signal and a frame. In FIG. 8, a negative stuff byte area corresponding to 1 byte is ensured in the overhead area 101a and a positive stuff byte area corresponding to 1 byte is ensured in the payload area 102.

The difference in frequency is absorbed by inserting a stuff byte or client data in the positive or negative stuff byte area. The stuff byte is fixed data such as "00000000" or "11111111."

FIGS. 9 through 11 illustrate frequency adjustment by the asynchronous mapping method. FIG. 9 illustrates frequency adjustment made in the case of the frequency of a client signal being higher than that of a payload area of a frame. In this case, client data is stored both in a positive stuff byte area and in a negative stuff byte area in order to absorb the difference in frequency.

FIG. 10 illustrates frequency adjustment made in the case of the frequency of the client signal being equal to that of the payload area of the frame. In this case, there is no difference in frequency between the client signal and the payload area of the frame, so the client data can be mapped into the payload area of the frame. Therefore, the client data is stored in the positive stuff byte area and a stuff byte is stored in the negative stuff byte area.

FIG. 11 illustrates frequency adjustment made in the case of the frequency of the client signal being lower than that of the payload area of the frame. In this case, a stuff byte is stored both in the positive stuff byte area and in the negative stuff byte area in order to absorb the difference in frequency.

A difference in frequency which can be absorbed is found from $$-PJO/\{m \cdot (n-r)\} < \text{difference in frequency} < NJO/\{m \cdot (n-r)\} \quad (1)$$

where PJO (Positive Justification Opportunity) is the number of positive stuff bytes and NJO (Negative Justification Opportunity) is the number of negative stuff bytes.

If m=4, (n−r)=3808, and PJO=NJO=1, then a difference in frequency which can be absorbed is given by $$-65 \text{ ppm} < \text{difference in frequency} < +65 \text{ ppm} \quad (2)$$

Therefore, if the difference in frequency between the client signal and the frame is in the range of −65 to +65 ppm in this example, then the client signal can be mapped into the frame.

The difference in frequency is absorbed by inserting a stuff byte in the above way. By doing so, the client signal is mapped into the frame. In this case, a stuff byte extraction process is performed at the receiving end of the frame. In order to extract the stuff byte, information indicative that the stuff byte or the client data is inserted in the positive or negative stuff byte area is stored in the overhead area of the frame and is transferred.

In the above example, 1 positive stuff byte and 1 negative stuff byte are included. Accordingly, information for indicating three stuff byte insertion states is stored in the overhead area at the sending end of the frame.

FIG. 12 indicates a stuff byte insertion state. In order to make three stuff byte insertions in bytes, information which consists of at least 2 bits should be assigned in the overhead area of the frame. For example, "11," "00," and "01" are assigned to Case 1, Case 2, and Case 3 respectively. By doing so, the sending end of the frame can inform the receiving end of the frame of a stuff byte insertion state.

There may be a greater difference in frequency between a client signal and a frame. In this case, the number of positive stuff bytes or negative stuff bytes is increased in order to map the client signal into the frame by the above asynchronous mapping method (usually the number of positive stuff bytes arranged in the payload area 102a is increased).

If the number of positive stuff bytes or negative stuff bytes increases, the number of information bits necessary for a stuffing process for inserting the positive stuff bytes or the negative stuff bytes also increases. The number of information bits necessary for performing a stuffing process is given by number of necessary bits=FLOOR(log$_2$(number of negative stuff bytes+number of positive stuff bytes+1))+1 (bits)     (3)

where FLOOR (x) is a function which omits figures after the decimal point of real number x. As can be seen from equation (3), the number of bits necessary for performing a stuffing process increases in proportion to the number of stuff bytes.

It is assumed that the number of positive stuff bytes is increased. It is assumed that when y (y<(n−r)) positive stuff bytes are arranged in the payload area 102a of FIG. 8, the y positive stuff bytes are arranged in succession in the (r+1)th column to the (r+y)th column.

At this time, at the receiving end of the frame, the frame including the y stuff bytes is received and a destuffing process (stuff extraction process) for extracting the stuff bytes is performed. However, if the y stuff bytes arranged in succession are removed, jitter or wander which causes fluctuations in the periodicity of a signal may occur (phenomenon of jitter or wander may also occur at the time of performing the stuffing process (stuff byte insertion process) at the sending end of the frame, but jitter or wander which occurs at the time of performing the destuffing process is intimately related with degradation in signal receiving characteristic).

With the asynchronous mapping method, as stated above, stuff bytes used for frequency adjustment may be inserted in succession in the payload area 102a. For example, if stuff bytes are inserted in a plurality of columns in the same row and are extracted at the receiving end of the frame, then jitter or wander occurs.

In the past, a technique for storing data corresponding to frequency deviation by which the permissible amount of absorption by negative stuff bytes is exceeded in FS bytes defined in an OTU frame was proposed as a technique for mapping a client signal into a frame (Japanese Laid-open Patent Publication No. 2008-113394).

In addition, a technique for detecting a position at which a local protocol signal is read out and assigning a stuff control amount at the time of mapping the local protocol signal into an OPU/ODU signal and a stuff control amount at the time of generating an ODTU signal on the basis of the position at which the local protocol signal is read out was proposed (Japanese Laid-open Patent Publication No. 2007-096822).

Furthermore, a technique for managing both the number of stuff bytes inserted and positions at which the stuff bytes are inserted and absorbing a difference in frequency was proposed (U.S. Pat. No. 7,020,094 B2).

In the above U.S. Pat. No. 7,020,094 (hereinafter simply referred to as the "prior art"), a technique for managing both the number of stuff bytes inserted and positions at which the stuff bytes are inserted, absorbing a difference in frequency, controlling the occurrence of jitter or wander, and mapping a client signal into a frame is disclosed.

FIG. 13 illustrates a frame format for describing the prior art. The size of a frame 50 is m rows×n columns. An overhead area 51 included in the frame 50 begins from the leading column of the frame 50 and its size is m rows×r columns. A payload area 52 follows the overhead area 51 and its size is m rows×(n−r) columns. In addition, address numbers from 1 to m×(n−r) are assigned to bytes in the payload area 52.

A client signal is mapped into the frame 50 by the prior art in the following way.

(1) On the basis of the difference in frequency between the client signal and the frame, the number of pieces of data of the client signal to be mapped into the payload area 52 is found from $$C_n = f_{client} \text{(bits/s)} \times T_{server} \text{(s)}/n \quad (4)$$

where $C_n$ is a number obtained by dividing the number of bits of client signal data to be mapped into the payload area 52 by n, $f_{client}$ is the bit rate (bits/s) of the client signal, and $T_{server}$ is the signal period (s) of the frame. If n=8, then $C_n$ represents the number of bytes of the client signal data to be mapped into the payload area 52. For the sake of simplicity it is assumed that n=8 in the following description.

(2) Whether the client signal data or a stuff byte is inserted into each byte in the frame is determined on the basis of:

$$N \times C_n \bmod(m \times (n-r)) < C_n \quad (5a)$$

$$N \times C_n \bmod(m \times (n-r)) \geq C_n \quad (5b)$$

where N is an address number assigned to each byte in the payload area 52 and (m×(n−r)) is the total number of bytes in the payload area 52. A left side in each of inequalities (5a) and (5b) means a remainder obtained by dividing (N×$C_n$) by (m×(n−r)), where $C_n$ is assumed as $C_8$.

In the case of inequality (5a), the remainder is smaller than $C_n$. In this case, client data is inserted at address N. In the case of inequality (5b), the remainder is greater than or equal to $C_n$. In this case, a stuff byte is inserted into at address N.

FIG. 14 illustrates an example of how stuff bytes and client data are arranged. With the prior art a stuff byte or client data is inserted into the payload area 52 of the frame on the basis of the value of $C_n$. In this case, jitter or wander may occur at the time of extracting the stuff byte at the receiving end of the frame. If stuff bytes are arranged in succession, jitter or wander may occur. Accordingly, stuff bytes are inserted into the payload area 52 so that they will be distributed uniformly in the payload area 52.

In order to perform a destuffing process at the receiving end of the frame, $C_n$ indicative of the number of bytes of the client signal inserted into the payload area 52 is stored in the overhead area 51 of the frame and is transferred at the sending end of the frame.

At this time the value of $C_n$ is in the range of 0 to (m×(n−r)). Therefore, in order to represent this value, bits the number of which is calculated by FLOOR(log$_2$(m·(n−r))+1 (bits)

are used.

With the above prior art, as has been described, the positions at which stuff bytes are inserted into the payload area 52 are calculated by the use of inequalities (5a) and (5b). By doing so, the stuff bytes are inserted into the payload area 52 so that they will not be arranged in succession. As a result, the occurrence of jitter or wander is controlled at the time of extracting the stuff bytes at the receiving end of the frame.

With the prior art, however, insertion determination (determination of whether to insert client data or a stuff byte) is made for each byte of the payload area 52 by the use of inequalities (5a) and (5b). As a result, the number of operations performed for the insertion determination is large and frame transmission performance deteriorates. If the frequency of the frame becomes higher, then the number of operations performed for the insertion determination increases greatly. Accordingly, it may be difficult to realize the insertion determination.

The problem with the prior art will now be described by the use of concrete numeric values. FIG. 15 illustrates an example of operation performed by the use of the prior art. It is assumed that the size of a payload area 52a of a frame is 24 bytes (in FIG. 15, a number indicated in a square frame is an address N assigned to each byte). In addition, it is assumed that the number $C_n$ of bytes of client signal data to be mapped into the payload area 52a is 17.

In order to map client data corresponding to $C_n$=17 bytes and stuff bytes into the payload area 52a the size of which is 24 bytes, insertion determination is made by the use of:

$$N \times 17 \bmod 24 < 17 \quad (5a\text{-}1)$$

$$N \times 17 \bmod 24 \geq 17 \quad (5b\text{-}1)$$

If inequality (5a-1) is satisfied, then client data is inserted at address N. If inequality (5b-1) is satisfied, then a stuff byte is inserted at address N.

To be concrete, when N=1, 17 mod 24=17 ($\geq$17). Accordingly, a stuff byte is inserted at address 1. When N=2, 34 mod 24=10 (<17). Accordingly, client data is inserted at address 2.

When N=3, 51 mod 24=3 (<17). Accordingly, client data is inserted at address 3. When N=4, 68 mod 24=20 ($\geq$17). Accordingly, a stuff byte is inserted at address 4. When N=5, 85 mod 24=13 (<17). Accordingly, client data is inserted at address 5.

Similarly, when N=23, 391 mod 24=7 (<17). Accordingly, client data is inserted at address 23. When N=24, 408 mod 24=0 (<17). Accordingly, client data is inserted at address 24.

As indicated in a payload area 52a-1, the client data and the stuff bytes are inserted as a result of the above insertion determination. The stuff bytes are arranged uniformly, so the occurrence of jitter or wander can be controlled, for example, at the time of extracting the stuff bytes.

However, the insertion determination is made for each byte in the payload area, so a very large number of operations are performed. In this example, the size of the payload area 52a is 24 bytes. Accordingly, in order to make the insertion determination for each byte in the payload area 52a, it is necessary to perform a total of 24 operations. With the prior art a large number of operations are performed in this way for making the insertion determination. As a result, a signal cannot be mapped efficiently and frame transmission performance deteriorates.

SUMMARY

According to an aspect of the present invention, there is provided a transmission apparatus including an insertion control unit which exercises insertion control for inserting a signal and a stuff byte into a payload area in a frame into which the signal is to be mapped and a frame sending unit which sends the frame after the insertion control, the insertion control unit inserting the signal or the stuff byte in columns of the frame into the payload area except a leading column.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 indicates a stuff byte insertion state;

DESCRIPTION OF EMBODIMENT(S)

Figure 1:
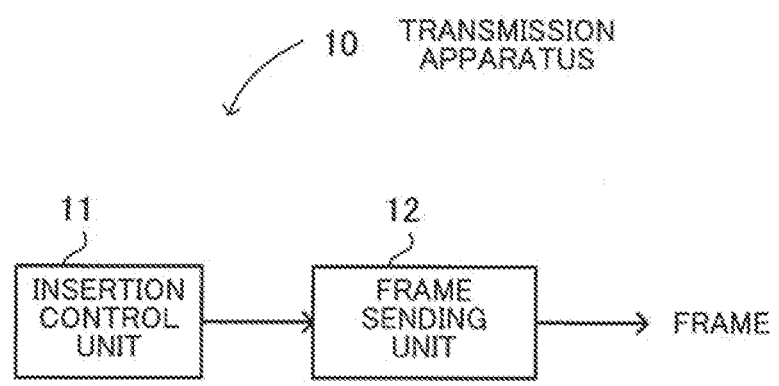
FIG. 1 illustrates an example of the structure of a transmission apparatus.

An embodiment will now be described in detail with reference to the accompanying drawings. FIG. 1 illustrates an example of the structure of a transmission apparatus. A transmission apparatus 10 includes an insertion control unit 11 and a frame sending unit 12.

When a signal (hereinafter referred to as a "client signal") including service information is mapped into a frame the rate of which is higher than that of the client signal, the insertion control unit 11 exercises insertion control for inserting the client signal and a stuff byte into a payload area in the frame into which the client signal is to be mapped. The frame sending unit 12 sends (transfers) the frame after the insertion control.

The insertion control unit 11 inserts the client signal or a stuff byte into the payload area.

Figure 2:
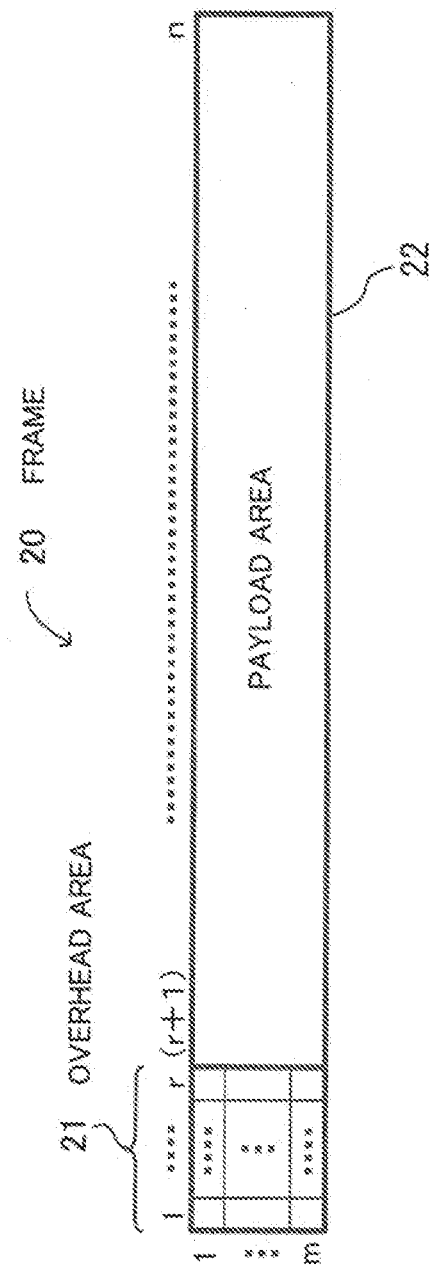
FIG. 2 illustrates a frame format.

FIG. 2 illustrates a frame format. The size of a frame 20 which the transmission apparatus 10 transmits is m rows×n (bytes). An overhead area 21 in the frame 20 which stores monitoring and control information and the like begins from the leading column of the frame 20 and its size is m×r (bytes). A payload area 22 into which a client signal is mapped follows the overhead area 21 and its size is m×(n−r) (bytes).

Figure 3:
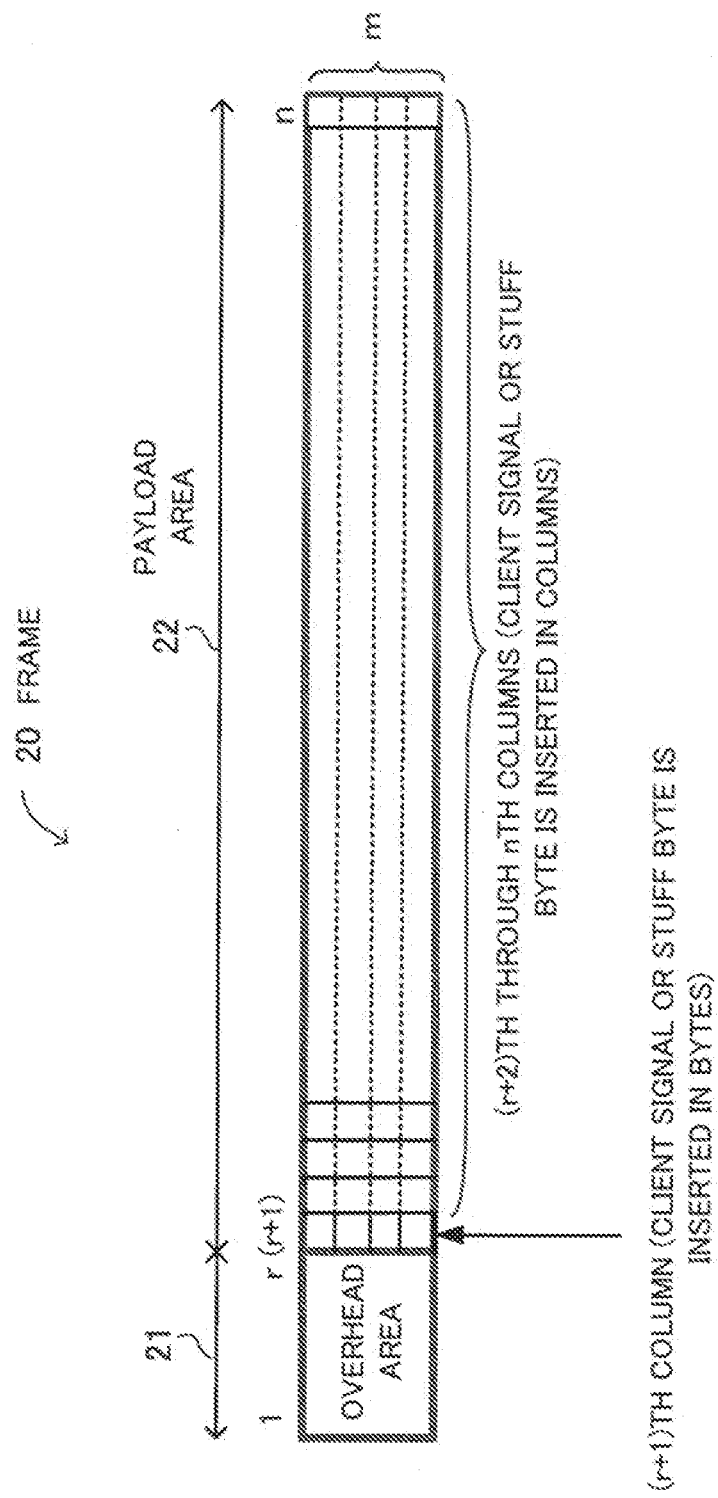
FIG. 3 illustrates how a client signal or a stuff byte is inserted.

FIG. 3 illustrates how a client signal or a stuff byte is inserted. The insertion control unit 11 inserts a client signal or a stuff byte into the payload area 22 by the use of the insertion determination inequalities described later.

At this time the insertion control unit 11 inserts the client signal or a stuff byte in columns into the payload area 22 except the leading column, that is to say, into the (r+2)th through nth columns of the frame 20. Accordingly, only the client signal or stuff bytes are arranged in the m rows of a corresponding column in the payload area 22.

The insertion control unit 11 inserts the client signal or a stuff byte in bytes into the leading column of the payload area 22, that is to say, into the (r+1)th column of the frame 20. As a result, the client signal and a stuff byte may mingle in the leading column of the payload area 22. The details of the insertion control will be described later.

Figure 4:
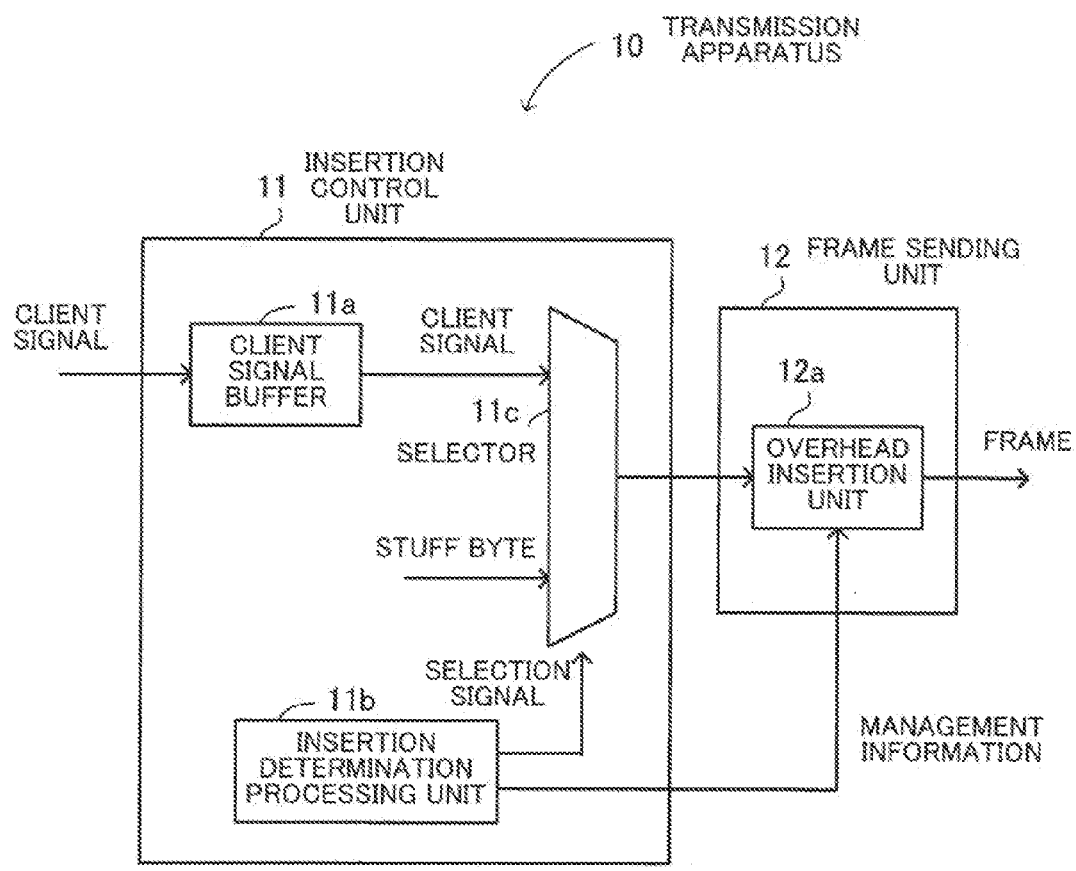
FIG. 4 is a block diagram of the transmission apparatus.

FIG. 4 is a block diagram of the transmission apparatus 10. The transmission apparatus 10 includes the insertion control unit 11 and the frame sending unit 12. The insertion control unit 11 includes a client signal buffer 11a, an insertion determination processing unit 11b, and a selector 11c. The frame sending unit 12 includes an overhead insertion unit 12a.

The client signal buffer 11a buffers a client signal. The insertion determination processing unit 11b determines on the basis of the insertion determination inequalities described later whether to insert the client signal or a stuff byte into a payload area 22 of a frame 20, and generates a selection signal for selecting the client signal or the stuff byte.

In addition, the insertion determination processing unit 11b manages both the number of stuff bytes inserted into the payload area 22 and positions at which the stuff bytes are inserted into the payload area 22, and generates management information. The insertion determination processing unit 11b then sends the management information to the overhead insertion unit 12a.

On the basis of the selection signal, the selector 11c outputs the client signal or the stuff byte and inserts it into a determined area of the payload area 22. The overhead insertion unit 12a adds overhead information (including the management information) in an overhead area 21 to payload information (client signal) in the payload area 22 to generate the frame 20, and sends it. At the receiving end of the frame, the number of the stuff bytes inserted into the payload area 22 and the positions at which the stuff bytes are inserted into the payload area 22 are recognized on the basis of the management information in the overhead area 21 and a destuffing process is performed.

The insertion control of a client signal or a stuff byte in the transmission apparatus 10 will now be described in detail. It is assumed that a client signal the rate ($f_{data}$ (bits/s)) of which is arbitrary is mapped into a frame the rate ($f_{server}$ (bits/s)) of which is arbitrary. The frame format illustrated in FIG. 2 will be applied.

It is assumed that the total number of bytes in one frame is $S_{total}$ (=m×n). A frame period is given by $$T_{server} = 8 \times S_{total}/f_{server} \text{ (sec)}$$

In this case, the number of bytes of the client signal to be mapped during one period of the frame is given by $$C_{data} = \text{int}(f_{data} \times T_{server}/8)$$

where int(x) is a function for finding an integral value for x. In addition, the total number of bytes in the payload area 22 of the frame 20 is given by $$S_{payload} = m \times (n-r)$$

Accordingly, in order to map the client signal into the frame 20 while absorbing the difference in frequency between the client signal and the frame 20, ($S_{payload} - C_{data}$) stuff bytes, together with client signal data (client data), should be mapped into the payload area 22.

Conditions necessary for mapping the client signal into the frame 20 while adjusting the difference in frequency between the client signal and the frame 20 by inserting the stuff bytes are as follows:

(Condition 1) The process of inserting the stuff bytes should be made easy (number of operations should be reduced).

(Condition 2) The stuff bytes should be arranged with a granularity of a byte (frequency adjustment should be made in bytes).

(Condition 3) Jitter or wander which occurs at the time of performing a stuffing process (stuff byte insertion process) or a destuffing process (stuff byte extraction process) should be reduced.

Insertion control will be exercised along the following lines with the above conditions taken into consideration.

(1) A stuff byte insertion process should be performed in columns, that is to say, in m bytes. By doing so, it is possible to make the stuff byte insertion process easy and reduce the number of operations. As a result, condition 1 is met.

(2) In order to realize frequency adjustment in bytes, a stuff byte insertion process should be performed not in columns but in bytes for the first column of the payload area 22 (condition 2 is met). The number of stuff bytes inserted in this process is in the range of 0 to (m−1) bytes.

(3) When stuff bytes are inserted in columns, they should be distributed uniformly in the payload area 22. By doing so, the occurrence of jitter or wander can be reduced at the time of inserting or extracting the stuff bytes. Accordingly, condition 3 is met.

Insertion control steps performed along the above lines are as follows:

(Step 1) Number i (i=1, . . . , (n−r)) is assigned to each column of the payload area 22.

(Step 2) Whether to insert client data or stuff bytes in columns is determined by the use of:

$$i \times \text{int}(C_{data}/m) \bmod \text{int}(S_{payload}/m) < \text{int}(C_{data}/m) \qquad (6a)$$

$$i \times \text{int}(C_{data}/m) \bmod \text{int}(S_{payload}/m) \geq \text{int}(C_{data}/m) \qquad (6b)$$

If inequality (6a) is satisfied, then client data bytes are inserted into the ith column of the payload area 22. If inequality (6b) is satisfied, then stuff bytes are inserted into the ith column of the payload area 22.

(Step 3) If $C_{data} < S_{payload}$, then $D_{coll}$ is found from $$D_{coll} = C_{data} \bmod m \qquad (7)$$

On the basis of equation (7), $D_{coll}$-byte client data is inserted into the first column of the payload area 22 and (m−$D_{coll}$) stuff bytes are inserted into the first column of the payload area 22.

In addition, a condition under which client data or a stuff byte is inserted into each byte area in the first column is based on:

$$N \times D_{coll} \bmod m < D_{coll} \qquad (8a)$$

$$N \times D_{coll} \bmod m \geq D_{coll} \qquad (8b)$$

where N (=1, 2, . . . , and m) is an address number given to each byte area from the first through mth rows in the first column of the payload area 22.

If inequality (8a) is satisfied, then client data is inserted into a byte area at address N in the first column of the payload area 22. If inequality (8b) is satisfied, then a stuff byte is inserted into a byte area at address N in the first column of the payload area 22.

Figure 5:
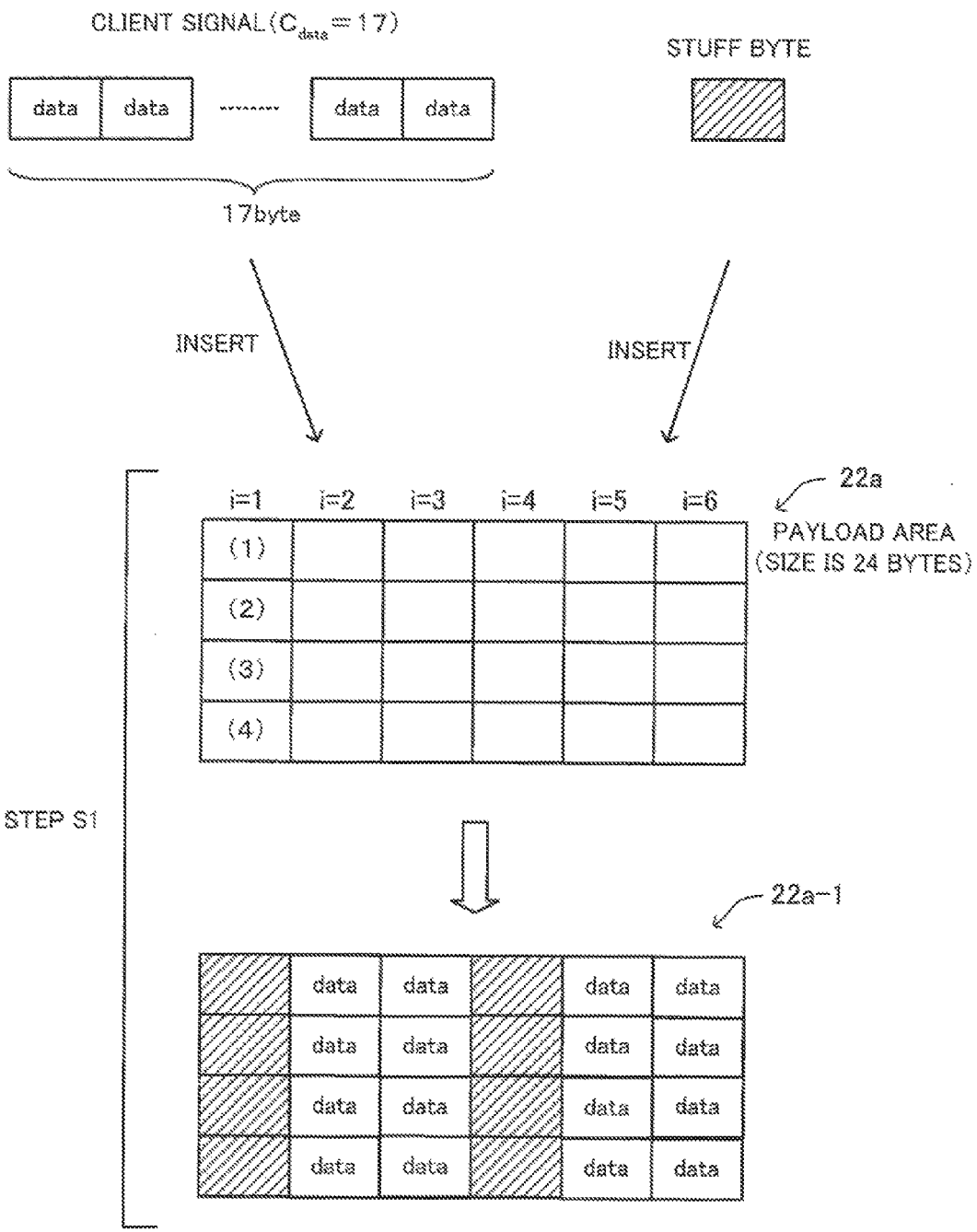
FIG. 5 illustrates an example of insertion control.
Figure 6:
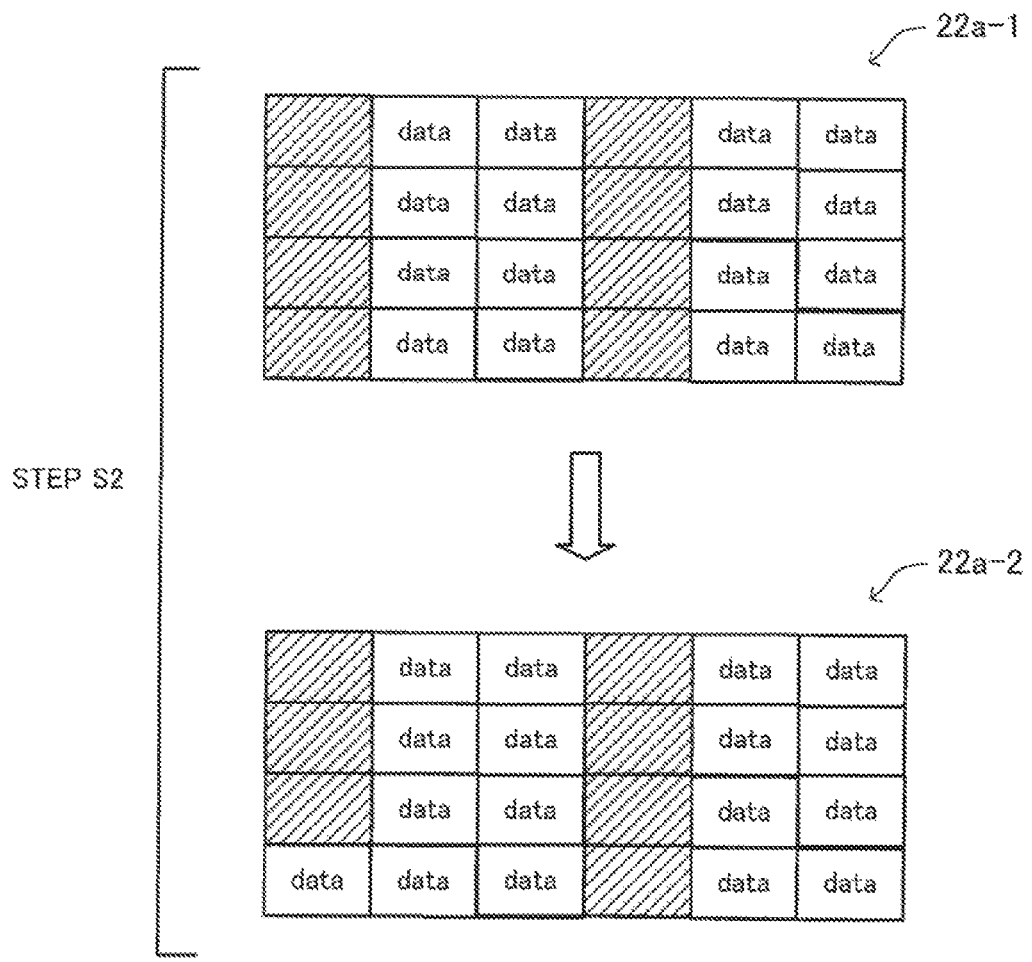
FIG. 6 illustrates an example of insertion control.
Figure 7:
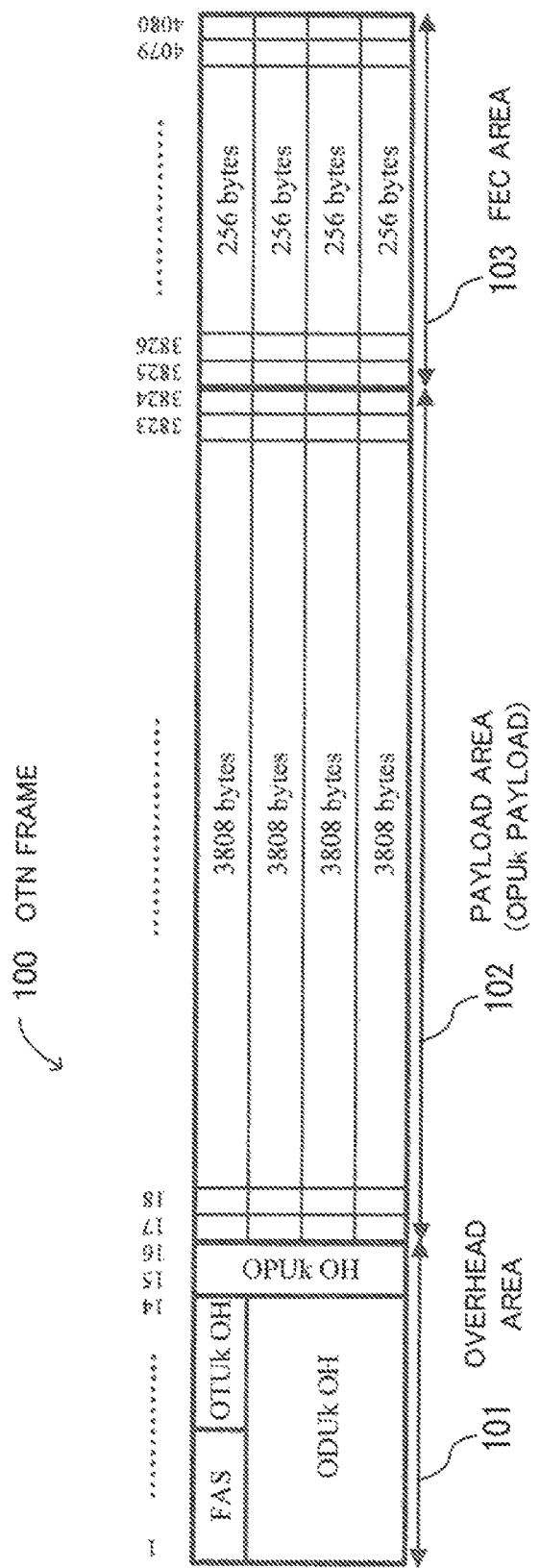
FIG. 7 illustrates the format of an OTN frame.
Figure 8:
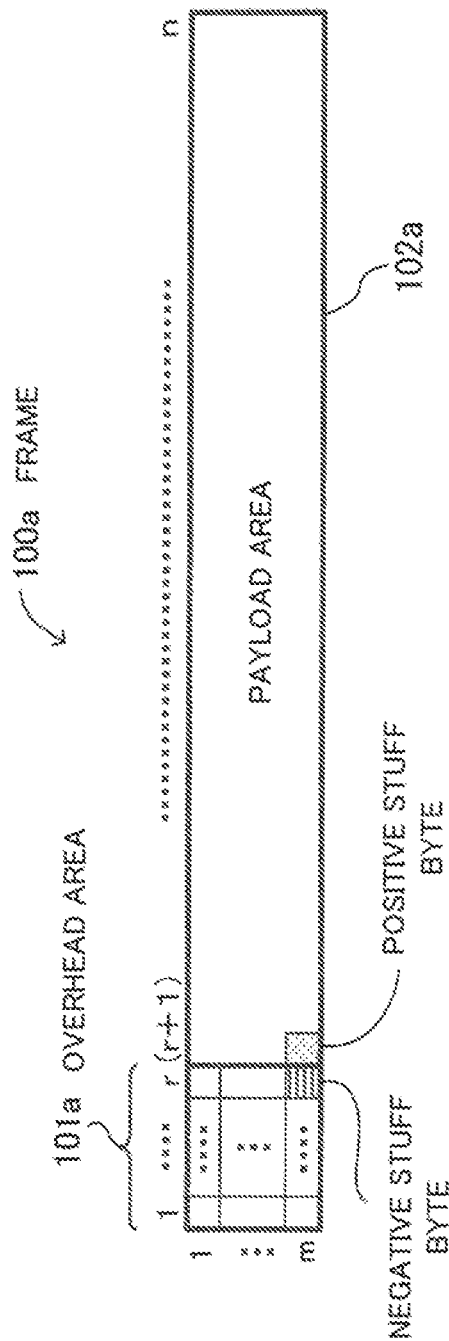
FIG. 8 illustrates a frame format for describing an asynchronous mapping method.
Figure 9:
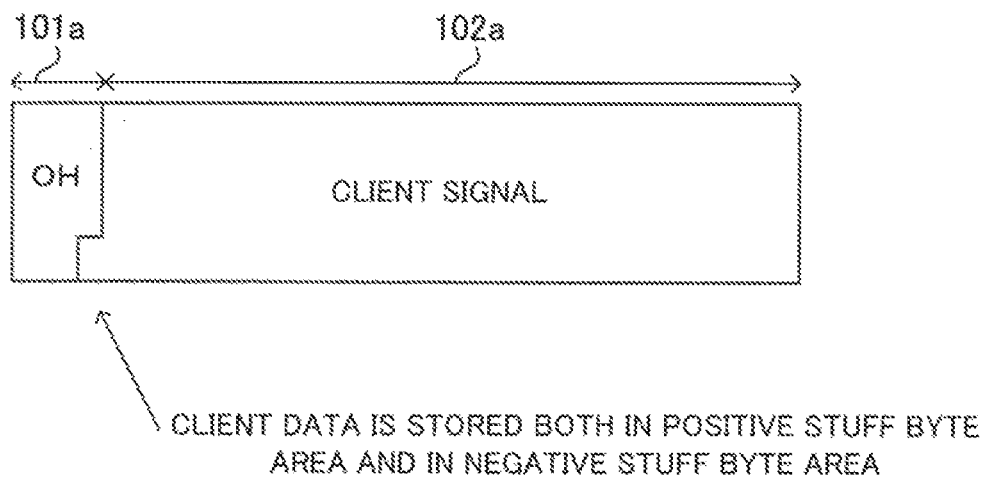
FIG. 9 illustrates frequency adjustment by the asynchronous mapping method.
Figure 10:
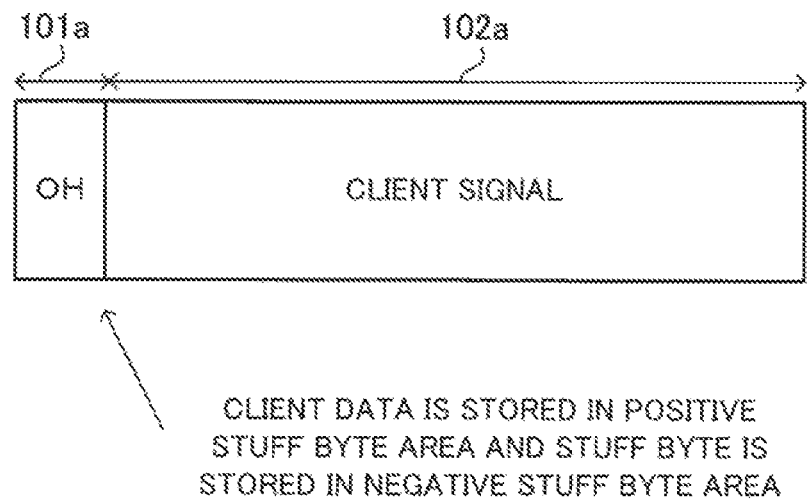
FIG. 10 illustrates frequency adjustment by the asynchronous mapping method.
Figure 11:
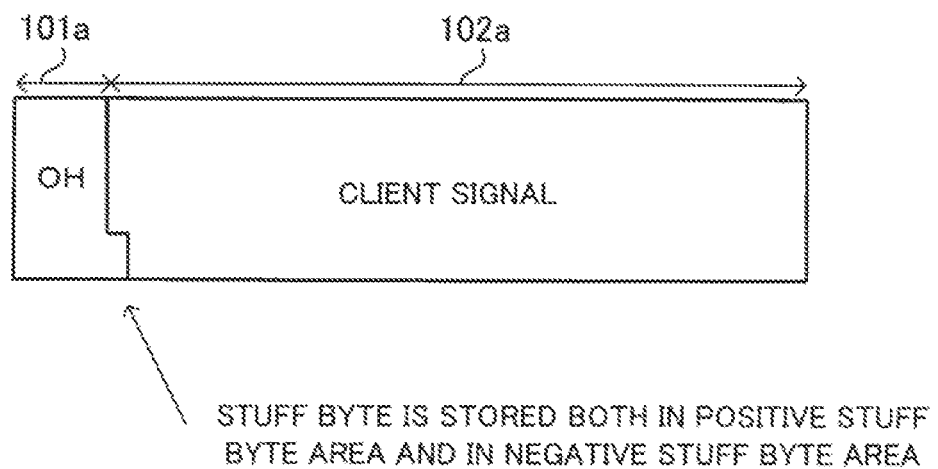
FIG. 11 illustrates frequency adjustment by the asynchronous mapping method.
Figure 13:
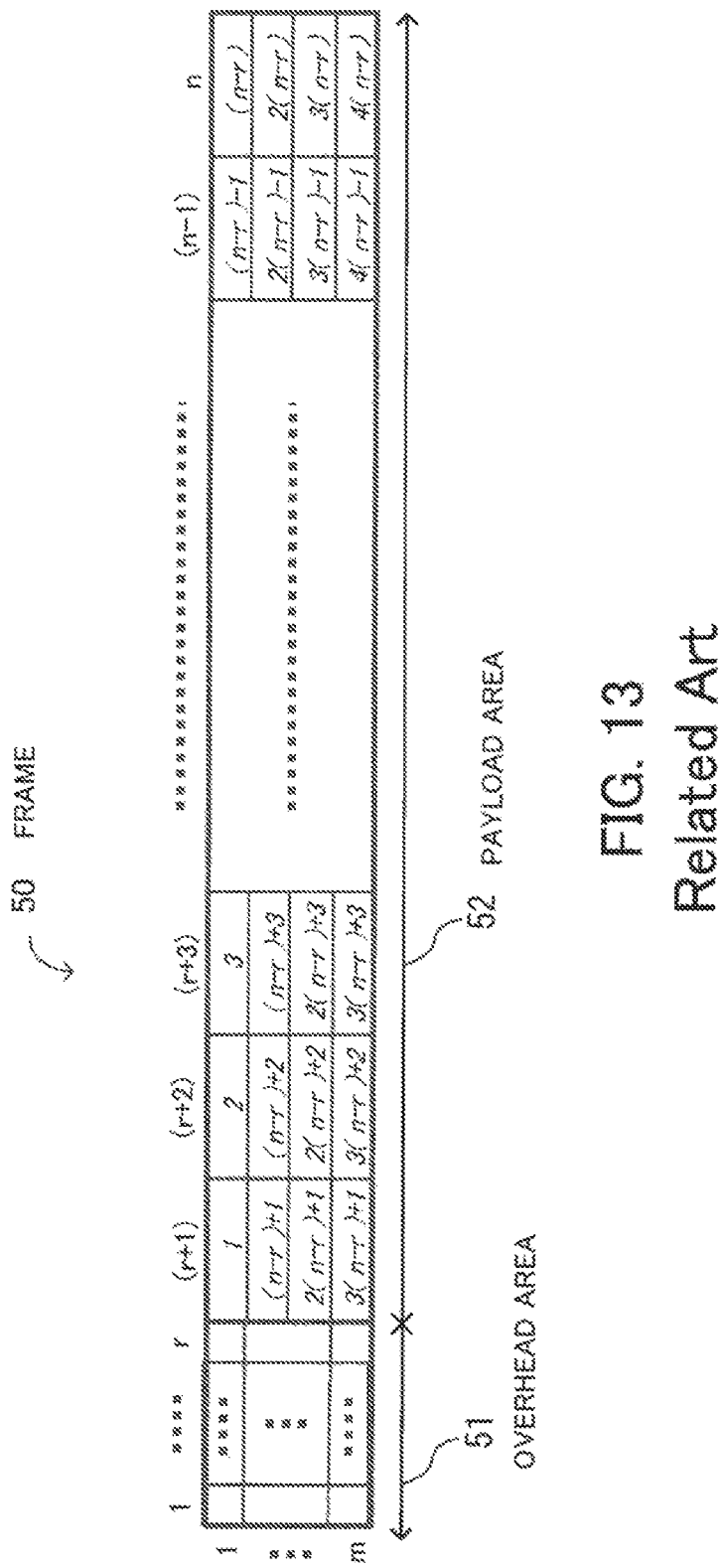
FIG. 13 illustrates a frame format for describing the prior art.
Figure 14:
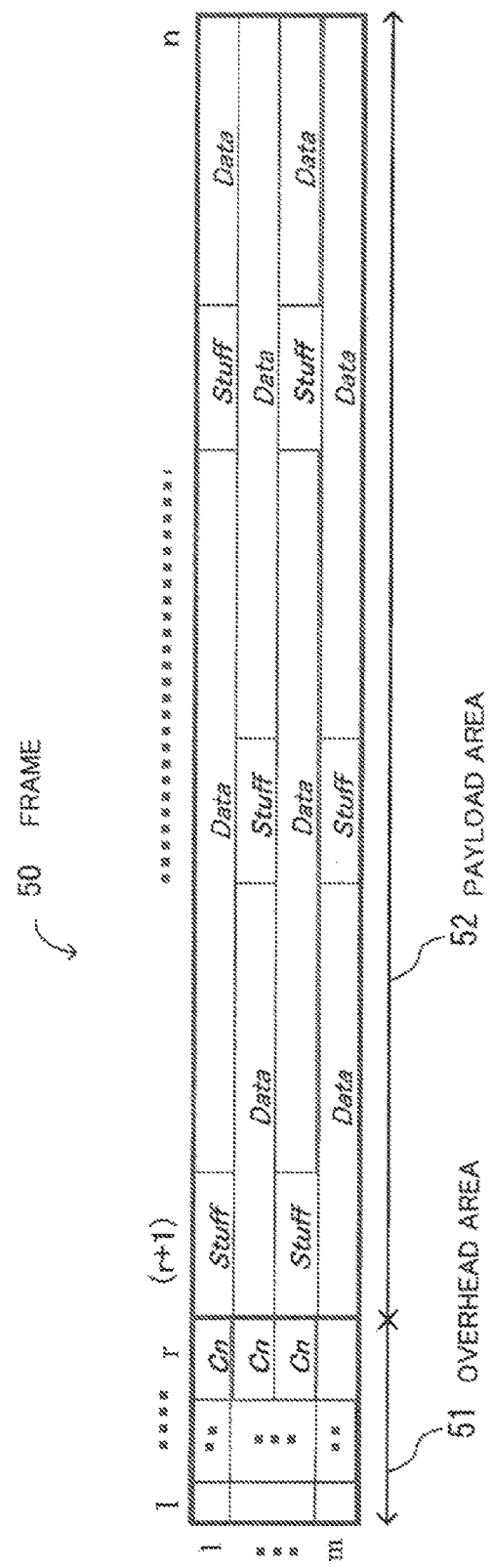
FIG. 14 illustrates an example of how stuff bytes and client data are arranged.

The insertion control will now be described by the use of concrete numeric values. Each of FIGS. 5 and 6 illustrates an example of the insertion control. It is assumed that the size of a payload area 22a of a frame is 24 bytes (in FIG. 5, a number in parentheses indicated in a square frame is address N assigned to each byte in the first column). In addition, it is assumed that the number $C_{data}$ of bytes of client signal data to be mapped into the payload area 22a is 17 (number of bytes in the payload area 22a and the number of bytes of the client signal data to be mapped are the same as those described in FIG. 15).

(Step S1) Insertion determination for mapping $C_{data}$(=17)-byte client data and stuff bytes into the payload area 22a the size of which is 24 bytes is made by the use of:

$$i \times \text{int}(17/4) \bmod \text{int}(24/4) < \text{int}(17/4) \qquad (6a\text{-}1)$$

$$i \times \text{int}(17/4) \bmod \text{int}(24/4) \geq \text{int}(17/4) \qquad (6b\text{-}1)$$

To be concrete, when i=1, 4 mod 6=4 (≥4). Accordingly, stuff bytes are inserted into the first column. When i=2, 8 mod 6=2 (<4). Accordingly, client data is inserted into the second column.

When i=3, 12 mod 6=0 (<4). Accordingly, client data is inserted into the third column. When i=4, 16 mod 6=4 (≥4). Accordingly, stuff bytes are inserted into the fourth column.

When i=5, 20 mod 6=2 (<4). Accordingly, client data is inserted into the fifth column. When i=6, 24 mod 6=0 (<4). Accordingly, client data is inserted into the sixth column. By inserting the client data or the stuff bytes in this way, the state of a payload area 22a-1 is obtained first.

(Step S2) By using equation (7), $$D_{coll} = C_{data} \bmod m = 17 \bmod 4 = 1$$

Therefore, the condition under which client data or a stuff byte is inserted into the first column is given by:

$$N \times D_{coll} \bmod 4 = N \bmod 4 < D_{coll} \qquad (8a\text{-}1)$$

$$N \times D_{coll} \bmod 4 = N \bmod 4 \geq D_{coll} \qquad (8b\text{-}1)$$

To be concrete, when N=1, 1 mod 4=1 (≥1). Accordingly, a stuff byte is inserted at address 1. When N=2, 2 mod 4=2 (≥1). Accordingly, a stuff byte is inserted at address 2.

When N=3, 3 mod 4=3 (≥1). Accordingly, a stuff byte is inserted at address 3. When N=4, 4 mod 4=0 (<1). Accordingly, client data is inserted at address 4.

The client data or the stuff bytes are inserted into the first column in this way. As a result, the state of a payload area 22a-2 is obtained. With the payload area 22a-2 the size of which is 24 bytes, the determined 17-byte client data is mapped and the stuff bytes are distributed uniformly.

Figure 15:
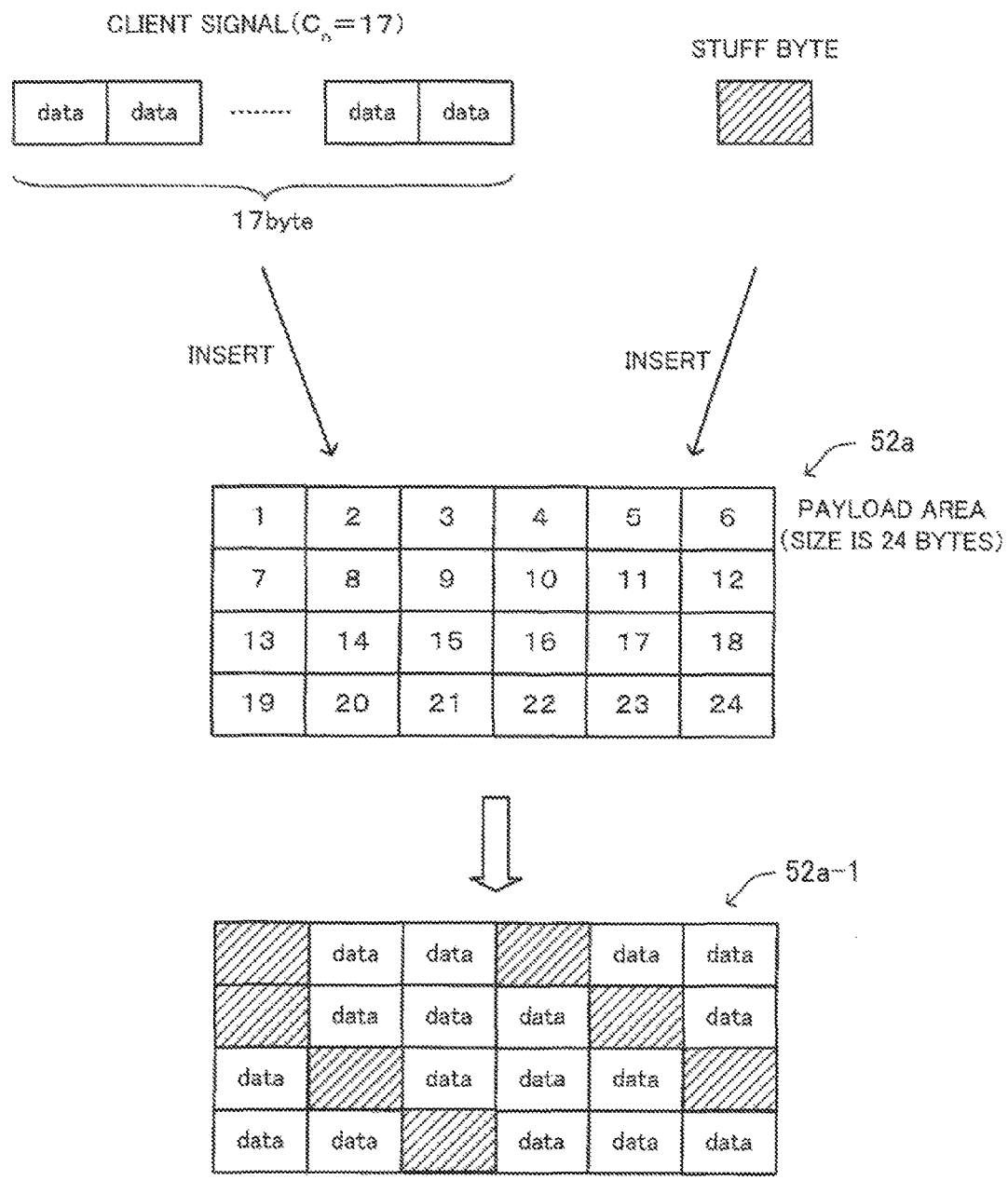
FIG. 15 illustrates an example of operation performed by the use of a prior art.

The number of operations performed in the case of using the prior art described in FIG. 15 will now be compared with the number of operations performed in FIGS. 5 and 6. With the prior art operations are performed in bytes for the payload area the size of which is 4 rows×6 columns, that is to say, 24 bytes. Accordingly, 24 operations are performed.

In the present invention, on the other hand, operations are performed in columns in step S1 for the payload area the size of which is the same as that of the payload area illustrated in FIG. 15. Accordingly, 6 operations are performed. Operations are performed in bytes in step S2 for the first column. Accordingly, 4 operations are performed. As a result, a total of 10 operations are performed. That is to say, it turns out that if insertion control is exercised by the transmission apparatus 10, the number of operations falls to a number smaller than half of the number of operations performed in the case of using the prior art.

According to the transmission apparatus 10, as has been described in the foregoing, in order to insert a client signal and stuff bytes into a payload area while absorbing the difference in frequency (signal rate) between the client signal and a frame, the client signal or the stuff bytes are inserted in columns of the frame into the payload area except the leading column in the case of the frequency of the client signal being lower than the frequency of the payload area of the frame.

That is to say, the client signal or a stuff byte is inserted in bytes into the leading column of the payload area and the client signal or stuff bytes are inserted in columns into the payload area except the leading column.

By doing so, the difference in frequency between the client signal and the frame is adjusted. In addition, the stuff bytes can be inserted into the payload area so that they will be distributed uniformly in the payload area. As a result, the occurrence of jitter or wander can be controlled at the time of performing a stuffing or destuffing process. Furthermore, the number of operations performed for determining whether to insert the client signal or a stuff byte can be reduced significantly. Accordingly, transmission performance can be improved.

It is possible to reduce the number of operations and improve transmission performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that various changes, substitutions, and alterations could be made hereto without departing from the spirit and scope of the invention.

What is claimed is:

1. A transmission apparatus comprising:
an insertion control unit which exercises insertion control for inserting a signal and a stuff byte into a payload area in a frame into which the signal is to be mapped; and
a frame sending unit which sends the frame after the insertion control,
wherein the insertion control unit inserts the signal or the stuff byte in columns of the frame into the payload area except a leading column;
wherein:
if $$i \times \text{int}(C_{data}/m) \bmod \text{int}(S_{payload}/m) < \text{int}(C_{data}/m) \qquad (1)$$

is satisfied, then the insertion control unit inserts the signal into an ith column of the payload area; and
if $$i \times \text{int}(C_{data}/m) \bmod \text{int}(S_{payload}/m) \text{int}(C_{data}/m) \qquad (2)$$

is satisfied, then the insertion control unit inserts the stuff byte into an ith column of the payload area
where, in inequalities (1) and (2), i is a column number assigned to a column of the payload area, m is a number of rows of the frame, $C_{data}$ is a number of bytes of the signal to be mapped, $S_{payload}$ is a total number of bytes of the payload area, int(x) is a function for finding an integral value for x, and (A mod B) represents a remainder obtained by dividing A by B.

2. The transmission apparatus according to claim 1, wherein the insertion control unit inserts the signal or the stuff byte in bytes into the leading column of the payload area.

3. The transmission apparatus according to claim 2, wherein:
if $$N \times D_{coll} \bmod m < D_{coll} \quad (3)$$

is satisfied, then the insertion control unit inserts the signal at address N in the leading column of the payload area; and if $$N \times D_{coll} \bmod m \geq D_{coll} \quad (4)$$

is satisfied, then the insertion control unit inserts the stuff byte at address N in the leading column of the payload area where, in inequalities (3) and (4), m is a number of rows of the frame, $C_{data}$ is a number of bytes of the signal to be mapped, N (=1, 2, ..., and m) is an address number assigned to each byte in the leading column of the payload area, (A mod B) represents a remainder obtained by dividing A by B, and $D_{coll} = C_{data} \bmod m$.

4. The transmission apparatus according to claim 1, wherein the insertion control unit inserts monitoring and control information into a column of the payload area to which i=1 is assigned.

5. The transmission apparatus according to claim 3, wherein the insertion control unit inserts monitoring and control information into a byte in the leading column of the payload area to which N=1 is assigned.

6. A signal mapping method for mapping a signal into a frame, the method comprising:

inserting the signal or a stuff byte in columns of the frame into a payload area in the frame except a leading column at the time of exercising insertion control for inserting the signal and the stuff byte into the payload area into which the signal is to be mapped;

wherein:

if $$i \times \text{int}(C_{data}/m) \bmod \text{int}(S_{payload}/m) < \text{int}(C_{data}/m) \quad (5)$$

is satisfied, then the signal is inserted into an ith column of the payload area; and if $$i \times \text{int}(C_{data}/m) \bmod \text{int}(S_{payload}/m) \text{int}(C_{data}/m) \quad (6)$$

is satisfied, then the stuff byte is inserted into an ith column of the payload area where, in inequalities (5) and (6), i is a column number assigned to a column of the payload area, m is a number of rows of the frame, $C_{data}$ is a number of bytes of the signal to be mapped, $S_{payload}$ is a total number of bytes of the payload area, int(x) is a function for finding an integral value for x, and (A mod B) represents a remainder obtained by dividing A by B.

7. The signal mapping method according to claim 6, wherein the signal or the stuff byte is inserted in bytes into the leading column of the payload area.

8. The signal mapping method according to claim 7, wherein:

if $$N \times D_{coll} \bmod m < D_{coll} \quad (7)$$

is satisfied, then the signal is inserted at address N in the leading column of the payload area; and if $$N \times D_{coll} \bmod m \geq D_{coll} \quad (8)$$

is satisfied, then the stuff byte is inserted at address N in the leading column of the payload area where, in inequalities (7) and (8), m is a number of rows of the frame, $C_{data}$ is a number of bytes of the signal to be mapped, N (=1, 2, ..., and m) is an address number assigned to each byte in the leading column of the payload area, (A mod B) represents a remainder obtained by dividing A by B, and $D_{coll} = C_{data} \bmod m$.

9. The signal mapping method according to claim 6, wherein monitoring and control information is inserted into a column of the payload area to which i=1 is assigned.

10. The signal mapping method according to claim 8, wherein monitoring and control information is inserted into a byte in the leading column of the payload area to which N=1 is assigned, where N (=1, 2, ..., and m) is variable of integers.

* * * * *